United States Patent
Waasdorp

(10) Patent No.: US 9,244,693 B2
(45) Date of Patent: Jan. 26, 2016

(54) SYSTEM AND METHOD FOR BOOTING MULTIPLE SERVERS FROM SNAPSHOTS OF AN OPERATING SYSTEM INSTALLATION IMAGE WHILE REDUCING ACCESS TO UNMODIFIED PORTIONS OF THE INSTALLATION IMAGE AND REDUCING LATENCIES BETWEEN SERVER PORTS

(71) Applicant: LSI Corporation, Milpitas, CA (US)

(72) Inventor: Gary A. Waasdorp, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 450 days.

(21) Appl. No.: 13/668,379

(22) Filed: Nov. 5, 2012

(65) Prior Publication Data
US 2014/0129816 A1    May 8, 2014

(51) Int. Cl.
*G06F 9/00* (2006.01)
*G06F 15/177* (2006.01)
*G06F 9/44* (2006.01)
*G06F 11/14* (2006.01)
*G06F 9/455* (2006.01)

(52) U.S. Cl.
CPC ............. *G06F 9/441* (2013.01); *G06F 9/4406* (2013.01); *G06F 9/4416* (2013.01); *G06F 9/45537* (2013.01); *G06F 11/1484* (2013.01); *G06F 15/177* (2013.01)

(58) Field of Classification Search
CPC . G06F 9/45537; G06F 15/177; G06F 9/4416; G06F 11/1484; G06F 2009/4557; G06F 9/4406; G06F 3/0607; G06F 3/0631; G06F 3/067; G06F 9/3832; G06F 9/5016; H04L 67/1097
See application file for complete search history.

(56) References Cited

U.S. PATENT DOCUMENTS

| | | | |
|---|---|---|---|
| 6,751,658 B1* | 6/2004 | Haun et al. ................ 709/222 |
| 7,234,053 B1* | 6/2007 | Mahmoud .................... 713/2 |
| 2003/0126242 A1* | 7/2003 | Chang ....................... 709/222 |
| 2004/0153639 A1* | 8/2004 | Cherian et al. ............... 713/2 |
| 2006/0059308 A1* | 3/2006 | Uratani et al. ............ 711/114 |
| 2009/0083404 A1 | 3/2009 | Lenzmeier et al. |
| 2009/0292737 A1 | 11/2009 | Hayton |
| 2010/0070631 A1* | 3/2010 | Cherian et al. ............. 709/225 |
| 2010/0107113 A1* | 4/2010 | Innes et al. ............... 715/779 |
| 2012/0047312 A1* | 2/2012 | Nathuji et al. ................ 711/6 |

* cited by examiner

*Primary Examiner* — Thomas Lee
*Assistant Examiner* — Zhipeng Wang

(57) ABSTRACT

The disclosure is directed to a system and method for booting a plurality of servers from at least one of a primary storage drive and a secondary storage drive. An operating system installation image is stored in a primary storage drive. Snapshots including modifications to the operating system installation image are stored in a plurality of partitions of a secondary storage device. A lookup table directs servers to read unmodified portions of the operating system installation image from the primary storage drive. The lookup table further directs servers to read modified portions of the operating system installation image from the secondary storage drive.

20 Claims, 3 Drawing Sheets

SYSTEM AND METHOD FOR BOOTING MULTIPLE SERVERS FROM SNAPSHOTS OF AN OPERATING SYSTEM INSTALLATION IMAGE WHILE REDUCING ACCESS TO UNMODIFIED PORTIONS OF THE INSTALLATION IMAGE AND REDUCING LATENCIES BETWEEN SERVER PORTS

BACKGROUND

Some data management systems include a plurality of servers that boot from an operating system installation image or from snapshots including modifications to the operating system installation image. The operating system installation image and snapshots are stored in partitions of a shared drive such as, but not limited to, a RAID volume. System performance is affected by competition among the servers attempting to simultaneously access the shared drive.

The shared drive typically includes one or more storage disks including, but not limited to, SATA hard disks. The servers rely on disk seek algorithms that tend to having weaker performance at outer disk tracks. Read look ahead buffers and other improvements can increase system performance by reducing latencies between server ports accessing the shared drive. However, any improvement is limited by continued competition among the servers for access to one or more disks of the shared drive.

SUMMARY

An embodiment of the disclosure is a system for booting a plurality of servers. The system includes a primary storage drive configured for storing an operating system installation image. The system further includes a secondary storage drive including a plurality of partitions configured for storing snapshots of the operating system installation image. Each snapshot includes at least one modification to the operating system installation image. The system further includes a lookup table in communication with at least one server of the plurality of servers. The lookup table is stored on at least one of the primary storage drive or the secondary storage drive. The lookup table is configured for directing the server to read from the primary storage drive when the server is reading an unmodified portion of the operating system installation image. The lookup table is further configured for directing the server to read from the secondary storage drive when the server is reading a modified portion of the operating system installation image.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
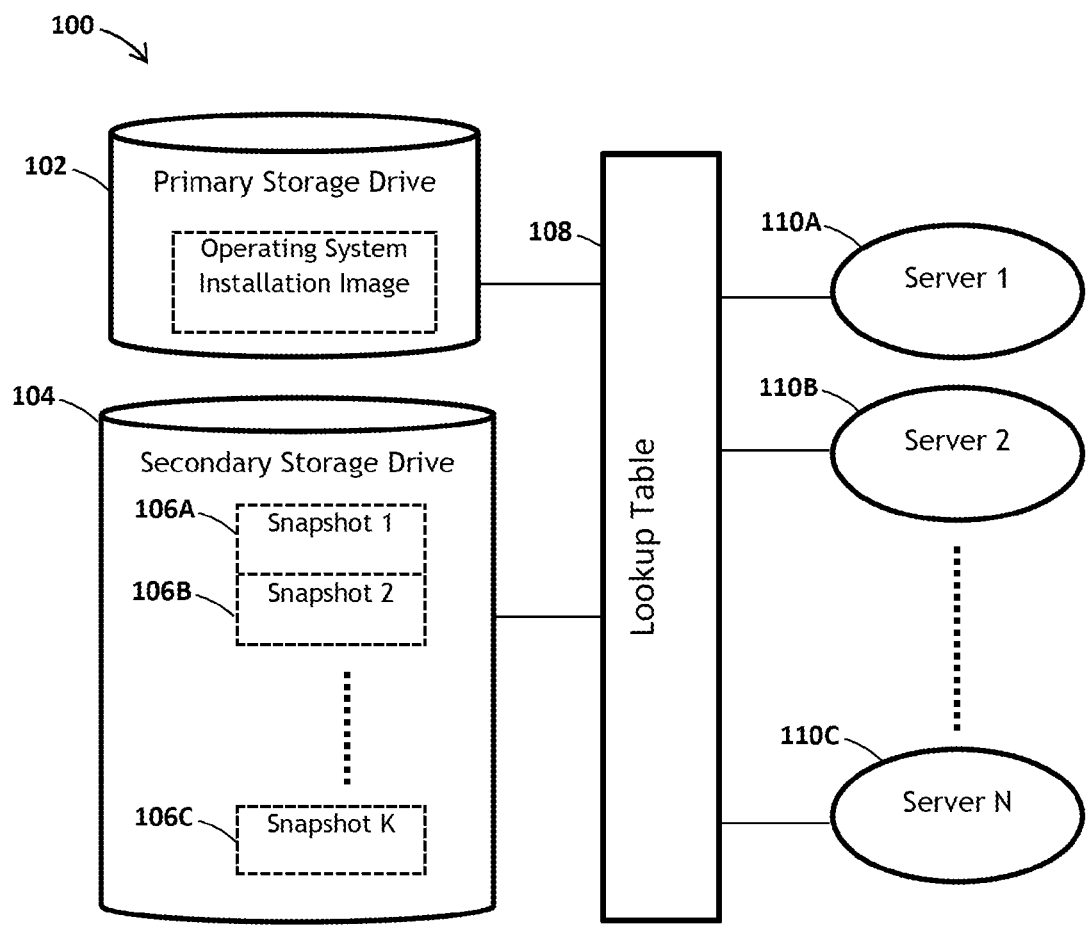
FIG. 1 is a block diagram illustrating a system for booting a plurality of servers, in accordance with an embodiment of the disclosure.
Figure 2:
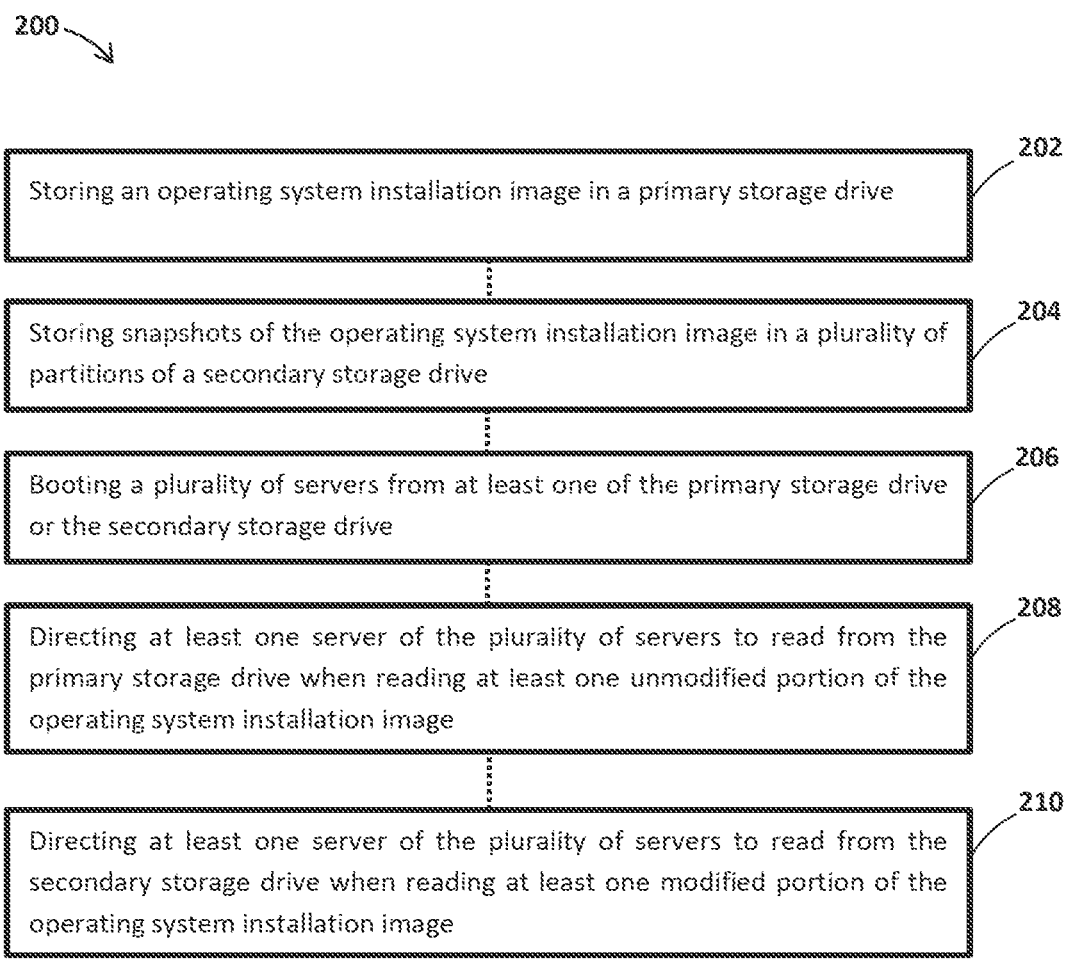
FIG. 2 is a flow diagram illustrating a method of booting a plurality of servers, in accordance with an embodiment of the disclosure.
Figure 3:
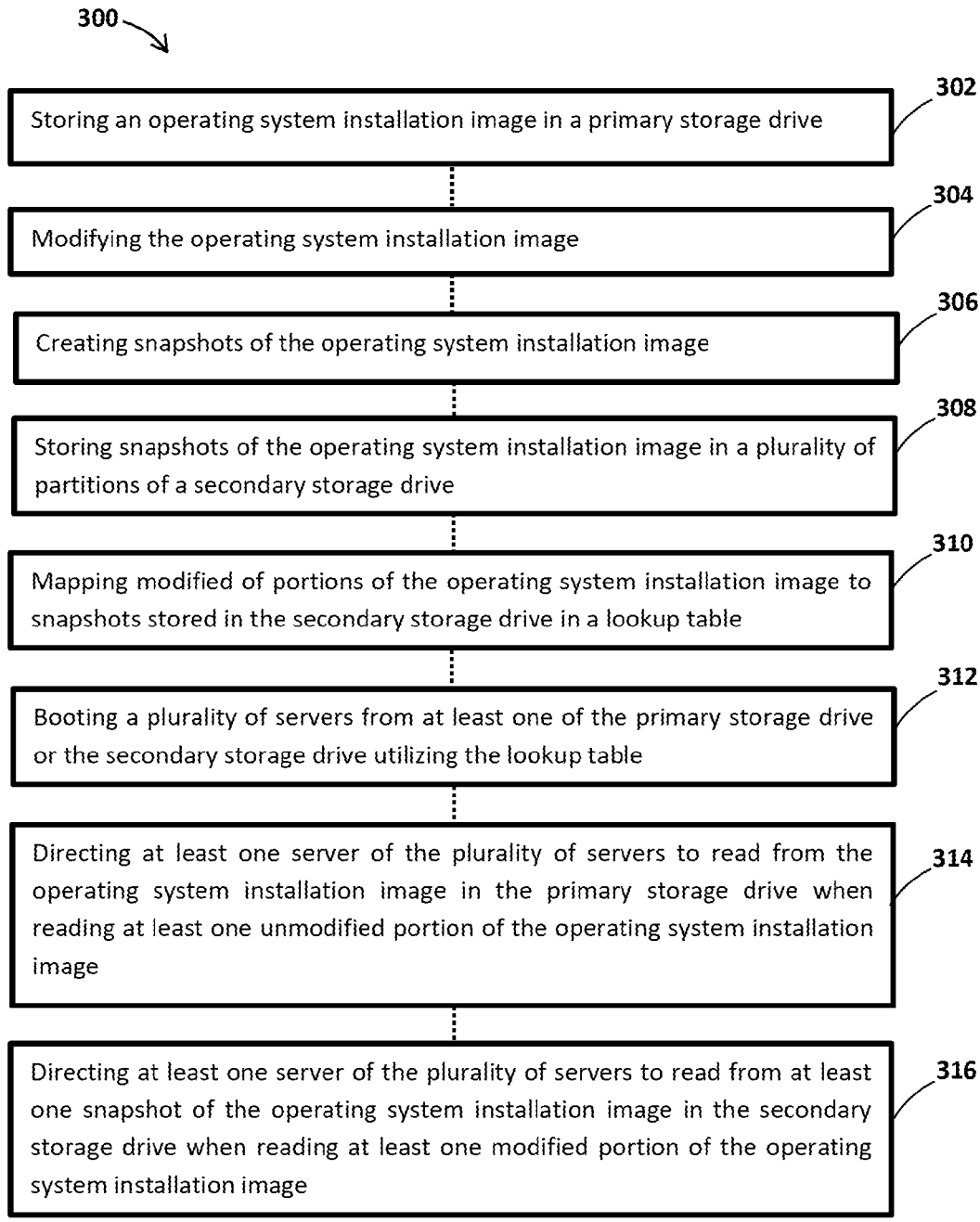
FIG. 3 is a flow diagram illustrating a method of booting a plurality of servers, in accordance with an embodiment of the disclosure.

FIGS. 1 through 3 illustrate embodiments of a system and method for booting a plurality of servers from an operating system installation image and snapshots including modifications to the operating system installation image. In an embodiment, illustrated in FIG. 1, a system 100 for booting a plurality of servers 110 includes a primary storage drive 102 and a secondary storage drive 104. The primary storage drive 102 is configured for storing an operating system installation image. In some embodiments, the operating system installation image stored in the primary storage drive 102 is an original or unmodified installation image. The secondary storage drive 104 is divided into a plurality of partitions 106 configured for storing snapshots of the operating system installation image. Each snapshot stored on a partition 106 of the secondary storage drive 104 includes at least one modification to the operating system installation image stored on the primary storage drive 102. In some embodiments, a snapshot includes a modified operating system installation image including at least one modified portion relative to the operating system installation image stored on the primary storage drive 102 and at least one unmodified portion of the operating system installation image. In other embodiments, a snapshot includes at least one modified portion of the operating system installation image without necessarily including remaining unmodified portions of the operating system installation image, thereby allowing the snapshot to be stored in less memory.

The system 100 further includes a lookup table 108 stored on at least one of the primary storage drive 102 or the secondary storage drive 104. The lookup table 108 is configured for directing servers 110 to read from at least one of the primary storage drive 102 or the secondary storage drive 104 when booting the operating system installation image. The lookup table 108 includes a bit mapping of modified portions of the operating system installation image in snapshots stored on partitions 106 of the secondary storage drive 104. Servers 110 in communication with the lookup table 108 are utilize the bit mapping to read unmodified portions of the operating system installation image from the primary storage drive 102. The servers 110 are further utilize the bit mapping to read modified portions of the operating system installation image from snapshots stored on partitions 106 of the secondary storage drive 104.

In an embodiment, the primary storage drive 102 has a higher performance level than the secondary storage drive 104. The primary storage drive 102 includes, but is not limited to, flash memory, a solid-state disk, or any other high performance storage device configured for multiple-server access. Meanwhile, the secondary storage drive 104 includes, but is not limited to, one or more hard disk drives, a RAID volume, or any other economical storage device configured for multiple-server access. The foregoing hybrid approach allows booting of unmodified portions of the operating system installation image from the high performance primary storage drive 102. In addition, the hybrid approach allows for booting of modified portions of the operating system installation image from snapshots in partitions 106 of the economical secondary storage drive 104.

Modifications to the operating system installation image are typically insubstantial. Accordingly, the servers 110 read from the higher performance primary storage drive 102 more frequently than the lower performance secondary storage drive 104 allowing for higher performance overall. The system 100 also has an economic advantage because snapshots are stored on the lower performance secondary storage drive 104. Therefore, the higher performance primary storage drive 102 does not require as much memory as the lower performance but more economical secondary storage drive 104. In some embodiments, the secondary storage drive 104 includes at least ten times as much memory as the primary storage drive 102.

In another embodiment, the primary storage drive 102 is further configured for storing the lookup table 108 including the bit mapping of modified portions of the operating system installation image in snapshots stored on partitions 106 of the secondary storage drive 104. Each server 110 is configured for accessing the bit mapping of the lookup table 108 via the primary storage drive 102 when booting the operating system. Storing the lookup table 108 on the primary storage drive 102 allows a server 110 to boot directly from the primary storage drive 102 without needing to access the secondary storage drive 104 when the server 110 is reading an unmodified portion of the operating system installation image.

In an embodiment, the lookup table is configured for directing the server 110 to boot at least one modified portion of the operating system installation image from a snapshot stored in a partition 106 of the secondary storage drive 104 and at least one unmodified portion from the operating system installation image stored on the primary storage drive 102. In another embodiment, the lookup table 108 is configured for directing the server 110 to boot a modified version of the operating system installation image entirely from a snapshot stored on a partition 106 of the secondary storage drive 104.

In another embodiment, the system 100 further includes a look ahead module in communication with the servers 110. The look ahead module includes any combination of hardware, software, or firmware, such as, but not limited to, at least one computing system including processor configured for executing program instructions from carrier media. The look ahead module is configured for anticipating future reads to reduce latencies between servers 110 accessing the primary storage drive 102 or the secondary storage drive 104. In an embodiment, the look ahead module includes at least one buffer on at least one communication port of each server 110. Each buffer is configured for caching reads made by each corresponding server 110. The look ahead module is configured for feeding forward the cached reads to anticipate future reads. In another embodiment, the look ahead module is configured for determining an order access for the servers 110 to at least one of the primary storage drive 102 or secondary storage drive 104 utilizing the cached reads.

An embodiment of a method 200 for booting a plurality of servers 110 is illustrated in FIG. 2. In some embodiments, method 200 is executed by one or more elements of system 100. However, the foregoing embodiments of system 100 should not be construed as limitations on method 200. It is contemplated that one or more of the following steps of method 200 can be executed by additional systems or devices known to the art.

At step 202, an operating system installation image is stored on a primary storage device 102 accessible by a plurality of servers 110. At step 204, snapshots including modifications to the operating system installation image are stored in partitions 106 of a secondary storage drive 104. At step 206, the plurality of servers 110 are booted from at least one of the primary storage drive 102 or the secondary storage drive 104. At step 208, at least one server 110 is directed to read at least one unmodified portion of the operating system installation image from the primary storage drive 102. At step 210, at least one server 110 is directed to read at least one modified portion of the operating system installation image from the secondary storage drive 104. In some embodiments, at least one server 110 is directed to boot from both drives by reading the unmodified portion of the operating system installation image from the primary storage drive 102 and the modified portion from the secondary storage drive 104.

In another embodiment, the primary storage drive 102 has a higher performance level than the secondary storage drive 104 to allow unmodified portions of the operating system installation image to be accessed from the primary storage drive 102 at a higher speed than modified portions of the operating system installation image accessed from snapshots stored on the secondary storage drive 104.

In another embodiment, the method 200 further includes a step of anticipating future reads made by each server 110 to reduce latencies between server ports accessing the primary storage drive 102 or the secondary storage drive 104. The future reads are anticipated utilizing information associated with cached past reads. In yet another embodiment, the anticipated future reads are utilized to determine an order servers 110 are provided access to the primary storage drive 102 or the secondary storage drive 104.

Another embodiment of a method 300 for booting a plurality of servers 110 is illustrated in FIG. 3. Any of the foregoing embodiments of method 200 similarly apply to method 300 unless otherwise noted. In some embodiments, method 300 is executed by one or more elements of system 100. However, the foregoing embodiments of system 100 or method 200 should not be construed as limitations on method 300. It is contemplated that one or more of the following steps of method 300 can be executed by additional systems or devices known to the art.

At step 302, an operating system installation image is stored on a primary storage drive 102 accessible by a plurality of servers 110. At step 304, one or more portions of the operating system installation image are modified. In some embodiments, modifications to the operating system installation image include, but are not limited to, adjusting boot parameters or startup conditions. In some embodiments, the modifications are selected specifically for one or more servers 110.

At step 306, modifications to the operating system installation image on the primary storage drive 102 are preserved by creating snapshots. In some embodiments, each snapshot includes a modified version of the operating system installation image with at least one modified portion relative to the operating system installation image on the primary storage drive 102. In other embodiments, each snapshot preserves a selected modification to the operating system installation image. At step 308, the snapshots are stored in partitions 106 of a secondary storage drive 104.

At step 310, modified portions of the operating system installation image are mapped to snapshots stored in partitions 106 of the secondary storage drive 104. In an embodiment, a lookup table 108 includes a bit mapping where bits are set to "0" or "1" values to represent modifications at corresponding portions of the operating system installation image. At step 312, each of the plurality of servers 110 is booted from at least one of the primary storage drive 102 or the secondary storage drive 104 utilizing the lookup table.

At steps 314, the lookup table 108 directs at least one server 110 to read at least one unmodified portion of the operating system installation image from the primary storage drive 102. At step 314, the lookup table 108 directs at least one server 110 to read at least one modified portion of the operating system installation image from the secondary storage drive 104. In some embodiments, at least one server 110 is directed to boot from both drives by reading the unmodified portion of the operating system installation image from the primary storage drive 102 and the modified portion from the secondary storage drive 104.

It should be recognized that in some embodiments the various steps described throughout the present disclosure may be carried out by a single computing system or multiple computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for booting a plurality of servers, comprising:
   a primary storage drive configured for storing an operating system installation image;
   a secondary storage drive including a plurality of partitions configured for storing snapshots of the operating system installation image, wherein each snapshot includes at least one modification to the operating system installation image, and wherein the primary storage drive has a first performance level and the secondary storage drive has a second performance level, said first performance level associated with a first storage medium of said primary drive and said second performance level associated with a second storage medium of said secondary storage drive;
   a plurality of servers configured for booting from at least one of the primary storage drive or the secondary storage drive; and
   a lookup table stored on at least one of the primary storage drive or the secondary storage drive, the lookup table configured for directing the at least one server to read from the primary storage drive when the at least one server is reading at least one unmodified portion of the operating system installation image, the lookup table further configured for directing the at least one server to read from the secondary storage drive when the at least one server is reading at least one modified portion of the operating system installation image.

2. The system of claim 1, wherein each server of the plurality of servers is configured for booting from the primary storage drive and the secondary storage drive.

3. The system of claim 2, wherein each server of the plurality of servers is configured for reading the at least one unmodified portion of the operating system installation image from the primary storage drive, wherein each server of the plurality of servers is further configured for reading the at least one modified portion of the operating system installation image from the secondary storage drive.

4. The system of claim 1, wherein the first performance level of the primary storage drive is a higher performance level than the second performance level of the secondary storage drive, and a snapshot of the secondary storage drive includes the at least one modification to the operating system installation image and at least one unmodified portion of the operating system installation image.

5. The system of claim 4, wherein the primary storage drive comprises flash memory.

6. The system of claim 4, wherein the secondary storage drive comprises at least one RAID volume.

7. The system of claim 1, wherein the primary storage drive includes the lookup table.

8. The system of claim 1, wherein the system further includes a look ahead module configured for anticipating future reads utilizing cached information associated with past reads, wherein anticipating future reads includes determining at least an access order for the plurality of servers for accessing the primary storage drive or the secondary storage drive.

9. A method of booting a plurality of servers, comprising:
   storing an operating system installation image in a primary storage drive;
   storing snapshots of the operating system installation image in a plurality of partitions of a secondary storage drive, wherein each snapshot includes at least one modification to the operating system installation image, and wherein the primary storage drive has a first performance level and the secondary storage drive has a second performance level, said first performance level associated with a first storage medium of said primary drive and said second performance level associated with a second storage medium of said secondary storage drive;
   booting a plurality of servers from at least one of the primary storage drive or the secondary storage drive;
   directing at least one server of the plurality of servers to read from the primary storage drive when the at least one server is reading at least one unmodified portion of the operating system installation image; and
   directing at least one server of the plurality of servers to read from the secondary storage drive when the at least one server is reading at least one modified portion of the operating system installation image.

10. The method of claim 9, wherein the method further includes:

booting at least one server of the plurality of servers from the primary storage drive and the secondary storage drive.

11. The method of claim 10, wherein the method further includes:
reading the at least one unmodified portion of the operating system installation image from the primary storage drive; and
reading the at least one modified portion of the operating system installation image from the secondary storage drive.

12. The method of claim 9, wherein the first performance level of the primary storage drive is a higher performance level than the second performance level of the secondary storage drive, and a snapshot of the secondary storage drive includes the at least one modification to the operating system installation image and at least one unmodified portion of the operating system installation image.

13. The method of claim 12, wherein the primary storage drive comprises flash memory.

14. The method of claim 12, wherein the secondary storage drive comprises at least one RAID volume.

15. The method of claim 9, wherein the method further includes:
caching information associated with past reads;
anticipating future reads utilizing cached information associated with past reads; and
prioritizing a plurality of accesses by the plurality of servers, wherein the prioritized plurality of accesses includes reading from the primary storage drive or the secondary storage drive.

16. A method of booting a plurality of servers, comprising:
storing an operating system installation image in a primary storage drive;
modifying the operating system installation image;
creating snapshots of the operating system installation image, each snapshot including at least one modification to the operating system installation image;
storing snapshots of the operating system installation image in a plurality of partitions of a secondary storage drive, and wherein the primary storage drive has a first performance level and the secondary storage drive has a second performance level, said first performance level associated with a first storage medium of said primary drive and said second performance level associated with a second storage medium of said secondary storage drive;
mapping modified portions of the operating system installation image to snapshots stored in the plurality of partitions of the secondary storage drive in a lookup table;
booting at least one server of a plurality of servers from at least one of the primary storage drive or the secondary storage drive utilizing the lookup table;
directing at least one server of the plurality of servers to read from the operating system installation image in the primary storage drive when the at least one server is reading at least one unmodified portion of the operating system installation image; and
directing at least one server of the plurality of servers to read from at least one snapshot of the operating system installation image in the secondary storage drive when the at least one server is reading at least one modified portion of the operating system installation image.

17. The method of claim 16, wherein the method further includes:
booting at least one server of the plurality of servers from the primary storage drive and the secondary storage drive.

18. The method of claim 17, wherein the method further includes:
reading the at least one unmodified portion of the operating system installation image from the primary storage drive; and
reading the at least one modified portion of the operating system installation image from the secondary storage drive.

19. The method of claim 16, wherein the first performance level of the primary storage drive is a higher performance level than the second performance level of the secondary storage drive, and a snapshot of the secondary storage drive includes the at least one modification to the operating system installation image and at least one unmodified portion of the operating system installation image.

20. The method of claim 16, wherein the method further includes:
caching information in a plurality of buffers, the information being associated with past reads, and each server of the plurality of servers having a buffer of the plurality of buffers connected to a communication port to cache the information;
anticipating future reads utilizing cached information associated with past reads; and
determining at least an access order for access to the primary storage drive or the secondary storage drive by the plurality of servers.

* * * * *